United States Patent
Kwon et al.

(10) Patent No.: US 10,496,317 B2
(45) Date of Patent: Dec. 3, 2019

(54) MEMORY SYSTEM INCLUDING MEMORIES HAVING DIFFERENT CHARACTERISTICS AND OPERATION METHOD THEREOF

(71) Applicant: SK hynix Inc., Gyeonggi-do (KR)

(72) Inventors: Yong-Kee Kwon, Gyeonggi-do (KR);
Yong-Ju Kim, Gyeonggi-do (KR);
Hong-Sik Kim, Gyeonggi-do (KR);
Sang-Gu Jo, Gyeonggi-do (KR);
Do-Sun Hong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 82 days.

(21) Appl. No.: 15/180,858

(22) Filed: Jun. 13, 2016

(65) Prior Publication Data
US 2017/0153844 A1    Jun. 1, 2017

(30) Foreign Application Priority Data
Nov. 27, 2015   (KR) .................... 10-2015-0167619

(51) Int. Cl.
*G06F 12/00* (2006.01)
*G06F 3/06* (2006.01)
*G06F 12/0802* (2016.01)
*G06F 12/0868* (2016.01)

(52) U.S. Cl.
CPC ............ *G06F 3/0647* (2013.01); *G06F 3/061* (2013.01); *G06F 3/0619* (2013.01); *G06F 3/0638* (2013.01); *G06F 3/0653* (2013.01); *G06F 3/0656* (2013.01); *G06F 3/0685* (2013.01); *G06F 12/0802* (2013.01); *G06F 12/0868* (2013.01); *G06F 2212/1024* (2013.01); *G06F 2212/1044* (2013.01); *G06F 2212/214* (2013.01); *G06F 2212/401* (2013.01); *G06F 2212/502* (2013.01); *G06F 2212/60* (2013.01)

(58) Field of Classification Search
CPC ...... G06F 3/0647; G06F 3/061; G06F 3/0619; G06F 3/0638; G06F 3/0653
See application file for complete search history.

(56) References Cited

U.S. PATENT DOCUMENTS

| | | | |
|---|---|---|---|
| 8,847,798 B2 | 9/2014 | Pell et al. | |
| 9,385,749 B1* | 7/2016 | Nam | H03M 7/6082 |
| 2012/0089579 A1 | 4/2012 | Ranade et al. | |
| 2012/0257241 A1* | 10/2012 | Narita | G06F 3/1221 |
| | | | 358/1.14 |

* cited by examiner

*Primary Examiner* — Gurtej Bansal
(74) *Attorney, Agent, or Firm* — IP & T Group LLP

(57) ABSTRACT

A memory system may include a first memory having a first operating speed, and a second memory having a second operating speed which is different from the first operating speed. A compression device may compress data of the first memory, and may transfer the compressed data to the second memory. The compression device may select a compression scheme among a plurality of compression schemes based on at least one characteristic of the data of the first memory and a data processing combination selected among a plurality of data processing combinations between a series of data processing units of the first memory and a series of data processing units of the second memory, and may compress the data of the first memory according to the selected compression scheme.

16 Claims, 6 Drawing Sheets

MEMORY SYSTEM INCLUDING MEMORIES HAVING DIFFERENT CHARACTERISTICS AND OPERATION METHOD THEREOF

CROSS-REFERENCE TO RELATED APPLICATION

This application claims priority under 35 U.S.C. § 119 to Korean Patent Application No. 10-2015-0167619 filed on Nov. 27, 2015 in the Korean Intellectual Property Office, the disclosure of which is Incorporated herein by reference in its entirety.

TECHNICAL FIELD

This patent document relates to a memory system and, more particularly, to a memory system including a plurality of memories.

BACKGROUND

Recently, computing systems (also referred to as data processing systems) including a plurality of memories having different characteristics (e.g., operating speed) have been proposed. For example, a memory channel storage (MCS) and a solid state drive (SSD) Include a nonvolatile memory (NVM). A memory system, including a memory channel storage (MCS), a solid state drive (SSD) and a nonvolatile memory (NVM) also include a volatile memory (VM) as a buffer memory for the nonvolatile memory (NVM). Therefore, a processing method for more efficient access to two or more memories of a memory system which have different characteristics is required.

SUMMARY

The present invention is generally directed to a device and method suitable for improving accessing a plurality of memories included in a memory system wherein the plurality of memories have at least one different characteristic. In an embodiment the device and method may increase the access capacity to the plurality of memories in the memory system.

The disclosed technology in this patent document includes device and method for increasing capacity in access between memories having two or more different characteristics through a compression technique in a memory system.

The disclosed technology in this patent document includes device and method for increasing capacity in data transfer between memories having two or more different characteristics through a compression technique thereby saving a cost in a memory system.

The disclosed technology in this patent document includes device and method for minimizing a compression overhead or latency in data transfer between memories having two or more different characteristics through a compression technique in a memory system.

In an embodiment, a memory system may include a first memory having a first operating speed, and a second memory having a second operating speed which is different from the first operating speed. A compression device may compress data of the first memory, and may transfer the compressed data to the second memory. The compression device may select a compression scheme among a plurality of compression schemes based on at least one characteristic of the data of the first memory and a data processing combination selected among a plurality of data processing combinations between a series of data processing units of the first memory and a series of data processing units of the second memory, and may compress the data of the first memory according to the selected compression scheme.

In another embodiment, an operating method of memory system may include compressing data of a first memory having a first operating speed, and transferring the compressed data to a second memory having a second operating speed which is different from the first operating speed. The compressing may include selecting a compression scheme among a plurality of compression schemes based on at least one characteristic of the data of the first memory and a data processing combination selected among a plurality of data processing combinations between a series of data processing units of the first memory and a series of data processing units of the second memory, and compressing the data according to the selected compression scheme.

DETAILED DESCRIPTION

Figure 1:
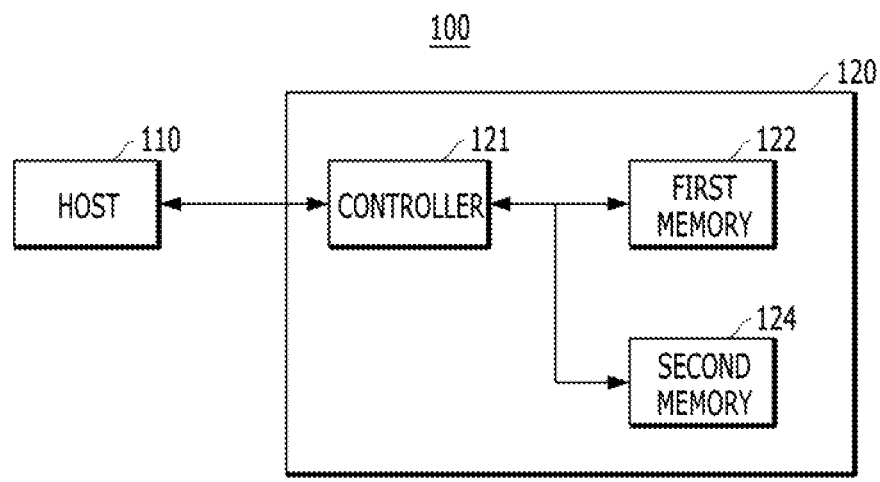
FIG. 1 is a configuration diagram illustrating a data processing system including first and second memories, according to an embodiment of the invention.

Various embodiments will be described below in more detail with reference to the accompanying drawings. The present Invention may, however, be embodied in different forms and should not be construed as limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

Referring now to FIG. 1, a data processing system 100 is provided, according to an embodiment of the invention.

Referring to FIG. 1, the data processing system (or a computing system) 100 may include a host 110 coupled to a memory system 120. The host 110 may be any suitable electronic device including, for example, portable electronic devices, such as a portable phone, a MP3 player, a laptop computer, and the like, or electronic devices, such as a desktop computer, a game machine, a TV, a projector, and the like. The data processing system 100 may be an Integral part of the host 110. The data processing system 100 may be separate from the host 110.

The memory system 120 may operate in response to a request from the host 110. More specifically, the memory system 120 may store data which may be accessed by the host 110. For example, the memory system 120 may be used as a main storage device or an auxiliary storage device of the host. The memory system 120 may be implemented with any one of a variety of types of storage devices according to a host interface protocol which is coupled to the host 110. For example, the memory system 120 may be implemented with any one of a variety of types of storage devices, such as a multi-media card of a solid state drive (SSD), a multi-media card (MMC), an embedded, multi-media card (eMMC), a reduced size, multi-media card (RS-MMC), and a micro-multi-media card (micro-MMC) type, such as a secure digital (SD) card of a secure digital (SD), a mini-secure digital (mini-SD) and a micro-secure digital (micro-SD) type, such as an universal storage bus (USB) storage device, a universal flash storage (UFS) device, a compact flash (CF) card, a smart media (SMC) card, a memory stick, and the like.

The memory system 120 may include at least two memories 122 and 124 having at least one different characteristic. For example, the memory system may include first and second memories 122 and 124 as illustrated in FIG. 1. The first and second memories 122 and 124 may have at least one different characteristic. For example, first memory 122 may be implemented with a volatile memory, such as, for example, a dynamic random access memory (DRAM) and a static random access memory (SRAM). For example, the second memory 124 may be implemented with a nonvolatile memory, such as, for example, a read only memory (ROM), a mask read only memory (MROM), a programmable read only memory (PROM), an electrically programmable read only memory (EPROM), an electrically erasable and programmable read only memory (EEPROM), a ferromagnetic random access memory (FRAM), a phase change random access memory (PRAM), a magnetic random access memory (MRAM), a resistive random access memory (RRAM), a flash memory and the like.

Figure 2A:
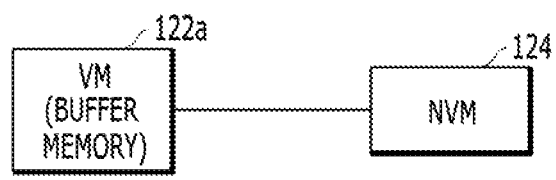
FIGS. 2A to 2C are diagrams Illustrating examples of the first and second memories of FIG. 1.
Figure 2B:
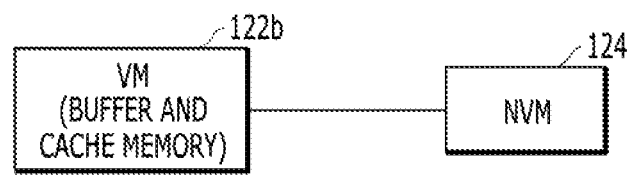
Figure 2C:
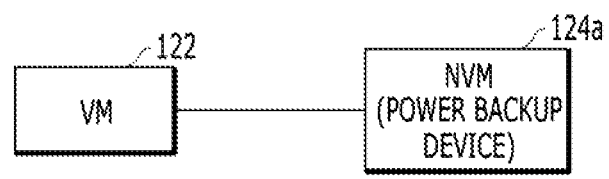

Referring now to FIGS. 2A to 2C examples of the first and second memories 122 and 124 of FIG. 1 are provided.

Referring to FIG. 2A, when the memory system 120 is a memory channel storage (MCS) and a solid state drive (SSD), the second memory 124 may be a nonvolatile memory like a flash memory and the first memory 122a may be a volatile memory functioning as a buffer memory for the nonvolatile memory 124.

Referring to FIG. 2B, when the memory system 120 is a memory channel storage (MCS) and a solid state drive (SSD), the second memory 124 may be a nonvolatile memory like a flash memory and the first memory 122b may be a volatile memory functioning as a buffer and cache memory for the nonvolatile memory.

Referring to FIG. 2C, when the memory system 120 is a nonvolatile dual in-line memory module (NVDIMM), the first memory 122 may be a volatile memory and the second memory 124a may be a power-backup storage for the volatile memory.

As described above, the disclosed embodiments describe examples which apply to the memory system 120 having the configurations illustrated in FIGS. 2A to 2C. However, the present invention is not limited to such examples only.

Referring back to FIG. 1, the memory system 120 may Include a controller 121 suitable for controlling the processing of data, which is accessed through the host 110, to be stored in at least one of the first and second memories 122 and 124. The controller 121 and at least one of the first and second memories 122 and 124 may be Integrated into a single semiconductor device.

The controller 121 may control the memory device in response to a request from the host 110. The controller 121 may store the data supplied from the host 110 in the memory device. The controller 121 may supply the data read from the memory device to the host 110.

The memory system 120 may be coupled to the host 110 through a host interface. For example, the host interface may be any suitable host interface including, for example, a serial advanced technology attachment (SATA), a peripheral component interconnect express (PCI-e), a double data rate (DDR) bus, a shared memory (SM) bus, and the like.

Figure 3:
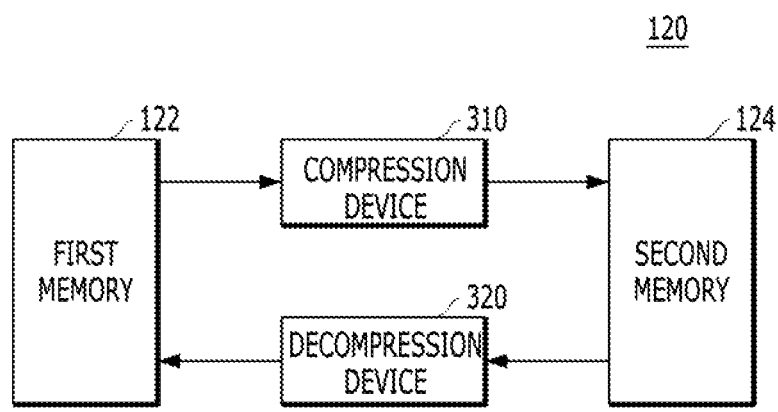
FIG. 3 is a diagram illustrating a configuration of the memory system of FIG. 1, wherein the memory system includes a compression device and a decompression device.

Referring now to FIG. 3 a configuration example of the memory system 120 is provided, according to an embodiment of the invention.

According to the embodiment illustrated in FIG. 3, the memory system 120 may include the first and second memories 122 and 124, a compression device 310, and a decompression device 320. The compression device 310, and the decompression device 320 may each be coupled between the first memory 122 and the second memory 124.

The first memory 122 may operate with a first operating speed, and the second memory 124 may operate with a second operating speed. The second operating speed may be different from the first operating speed. For example, when the first memory 122 is a volatile memory and the second memory 124 is a nonvolatile memory, the operating speed of the second memory 124 may be slower than the operating speed of the first memory 122. That is, the operating speed of the first memory 122 may be faster than the operating speed of the second memory 124. For example, the first memory 122 may be at least one of a buffer memory for the nonvolatile memory 124 and a buffer and cache memory. In an embodiment, the second memory 124 may be a power backup storage for the volatile memory 122.

The data supplied from the host 110 illustrated in FIG. 1 may be stored in the second memory 124 through the first memory 122. Also, the data stored in the second memory 124 may be supplied to the host 110 through the first memory 122.

The compression device 310 may compress input data from the first memory 122, and may transfer the compressed data to the second memory 124. The compression device 310 may select any one of a plurality of compression schemes, and may compress the input data according to the selected compression scheme.

In an embodiment, the compression device 310 may select any one of a plurality of compression schemes based on a characteristic of the input data. For example, the characteristic of the input data may represent the ratio of values (0/1) included in the input data.

In another embodiment, the compression device 310 may select any one among the plurality of compression schemes based on a selected data processing combination among a plurality of data processing combinations between a series of data processing units of the first memory and a series of data processing units of the second memory. For example, the series of data processing units may include units of read and/or write operations of the first and second memories 122 and 124.

The compression device 310 may reset the selected compression scheme at a predetermined time. For example, the compression device 310 may reset a selected compression scheme when a computer which includes the memory system is booted.

Figure 6A:
FIGS. 6A and 6B are diagrams illustrating examples of a data processing operation through the compression device of FIG. 3.
Figure 6B:
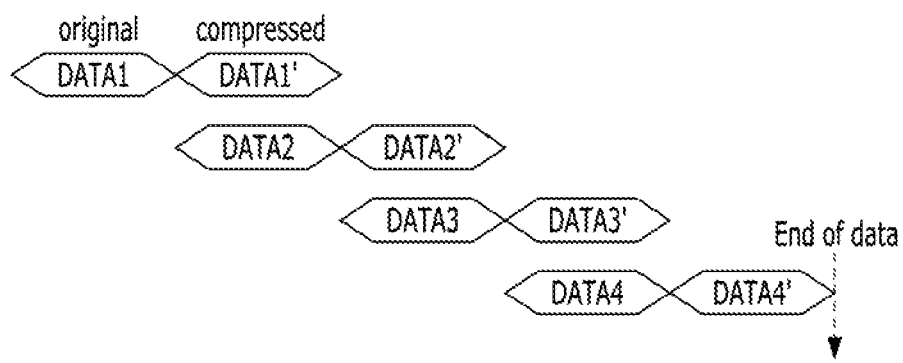

The diagrams of FIGS. 6A and 6B schematically illustrate examples of a data processing operation through the compression device 310.

In an embodiment, as illustrated in FIG. 6A, the compression device 310 may sequentially receive a plurality of input data, compress the plurality of inputted data, and then output the compressed input data. For example, the compression device 310 may perform compression processing on a first data DATA1 to generate a first compressed data DATA1'. Then, the compression device 310 may perform compression processing on a second data DATA2 to generate a second compressed data DATA2'. Then, the compression device 310 may perform compression processing on a third data DATA3 to generate a third compressed data DATA3'. Then, the compression device 310 may perform compression processing on a fourth data DATA4 to generate a fourth compressed data DATA4'. The compressed first to fourth data may then be sequentially transmitted to the second memory device 124. In other words, in an embodiment the compressor device 310 may perform a compression processing operation on a set of Input data, for example on a first to fourth input data, and then transmit the compressed input data, for example, the first to fourth compressed input data to the second device 124. Transmission of the set of compressed data to the second memory device, for example the first to fourth compressed input data, may then be performed simultaneously or sequentially.

In another embodiment, as Illustrated in FIG. 6B, the compression device 310 may compress and output the input data through a pipelining technique. For example, the compression device 310 may generate a compressed data DATA1' by performing compression processing on a first data DATA1, and at the same time, the compression device 310 may receive a second data DATA2. The compression device 310 may generate compressed data DATA2' by performing compression processing on the second data DATA2, and at the same time, the compression device 310 may receive a third data DATA3. The compression device 310 may generate compressed data DATA3' by performing compression processing on the third data DATA3, and at the same time, the compression device 310 may receive a fourth data DATA4.

The decompression device 320 may decompress the compressed data of the second memory 124 based on the selected compression scheme through the compression device 310, and may transfer the decompressed data to the first memory 122.

Figure 4:
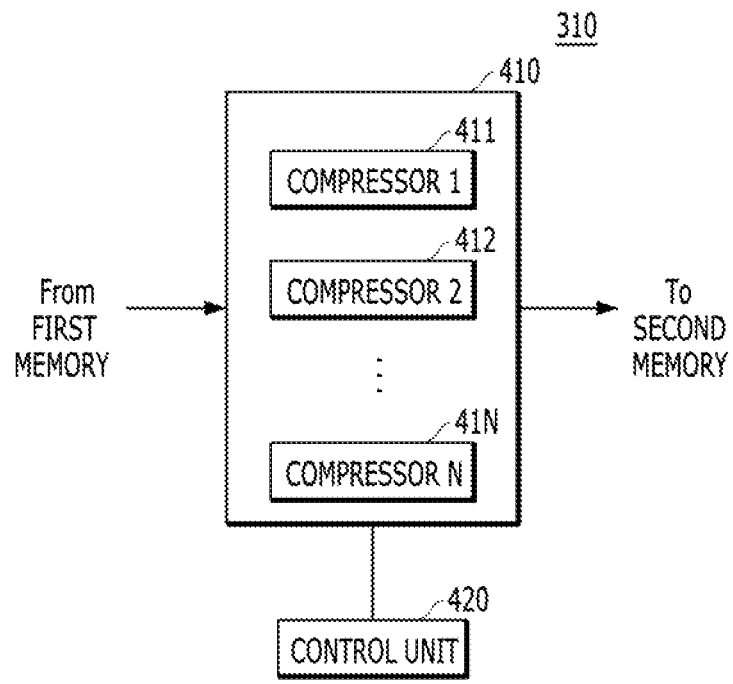
FIG. 4 is a diagram Illustrating a configuration of the compression device of FIG. 3.

FIG. 4 is a configuration diagram illustrating an example of the compression device 310.

According to the example of FIG. 4, the compression device 310 may include a compression unit 410 and a control unit 420. The compression unit 410 may include a plurality (for example, N) of compressors 411 to 41N, each of which may perform a compression operation according to a different compression algorithm. For example, each of the compressors 411 to 41N may perform the compression operation according to compression algorithm, such as, for example, a frequent value compression (FVC), a frequent pattern compression (FPC), a base-delta immediate compression (BDI), a linearly compressed page (LCP), and the like. The compression unit 410 may compress the data supplied from the first memory 122, and may output the compressed data to the second memory 124.

The control unit 420 may select at least one compressor among the compressors 411 to 41N included in the compression unit 410. Then the control unit 420 may control the selected at least one compressor to compress the data supplied from the first memory 122, and control the compressed data to be output to the second memory 124.

In an embodiment, the control unit 420 may select at least one compressor among the plurality of compressors 411 to 41N based on a characteristic of the input data. For example, the characteristic of the input data may be the ratio of values (0/1) included in the input data. Any other suitable characteristic of the input data may be used by the control unit 420 for selecting the at least one compressor among the plurality of compressors 411 to 41N.

In another embodiment, the control unit 420 may select at least one compressor among the plurality of compressors of 411 to 41N based on a selected data processing combination among a plurality of data processing combinations between a series of data processing units of the first memory 122 and a series of data processing units of the second memory 124. For example, the series of data processing units may include units of read and/or write operations of the first memory 122 and the second memory 124.

Figure 5:
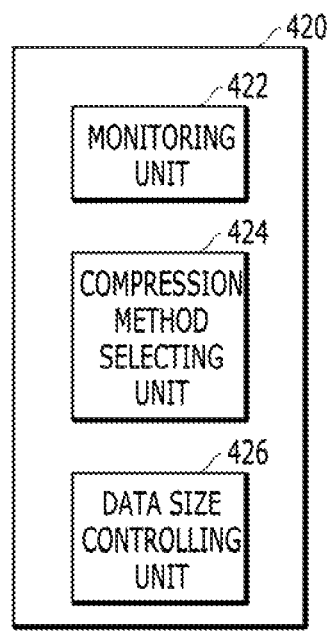
FIG. 5 is a diagram illustrating a configuration of the control unit of FIG. 4.

FIG. 5 illustrating a configuration of the control unit 420 according to an embodiment of the invention.

Referring to FIG. 5, the control unit 420 may select a compression scheme among a plurality of compression schemes based on at least one characteristic of input data and a data processing combination selected among a plurality of data processing combinations between a series of data processing units of the first memory 122 and a series of data processing units of the second memory 124 as illustrated in FIG. 3. The control unit 420 may then compress the input data according to the selected compression scheme. For such an operation, the control unit 420 may include a monitoring unit 422, a compression scheme selecting unit 424 and a data size controlling unit 426.

In an embodiment, the monitoring unit 422 may monitor a compression ratio corresponding to each of the plurality of compression schemes based on the at least one characteristic of the input data used for selecting the compressor. The compression scheme selecting unit 424 may select a compression scheme which maximizes the compression ratio among the plurality of compression schemes.

The at least one characteristic of the input data, for example, a workload may represent a ratio of write/read request values included the input data. The ratio of values (0/1) may be different from each workload. According to the ratio of values (0/1), a first compression technique 1 may have the highest compression ratio during a certain period, whereas a third compression technique 3 may have the highest compression ratio during another period. The compression scheme selecting unit 424 may use the first compression technique 1 when the first compression technique 1 has the highest compression ratio at a first time period. The compression scheme selecting unit 424 may use the third compression technique 3 when the third compression technique 3 has the highest compression ratio at a second time period.

Figure 7A:
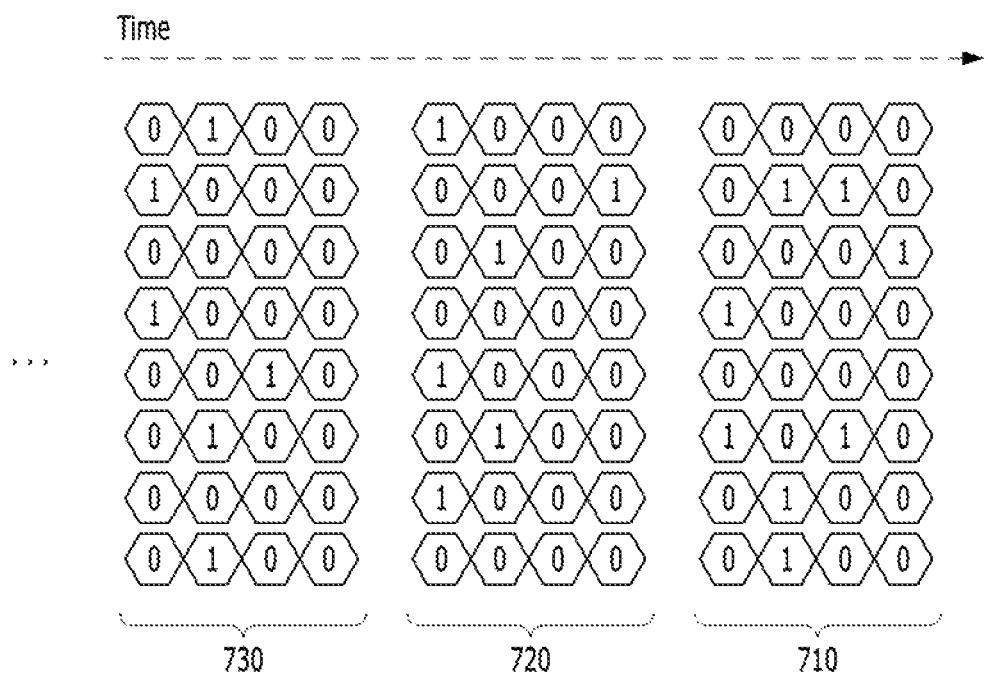
FIG. 7A is a diagram illustrating an example of a data processing operation through a compression device of FIG. 3.

FIG. 7A is a diagram illustrating an example of a data processing operation through the compression device 310.

Referring to FIG. 7A, the workload characteristic of the input data may be changed over time. The value of data to be compressed may be changed over time including time periods 710 to 730. The compression rate may be changed according to the compression techniques when the value of the data to be compressed may be changed.

Referring back to FIG. 5, in yet another embodiment, the monitoring unit 422 may monitor the compression ratio corresponding to each of the plurality of the data processing combinations between a series of data processing units of the first memory 122 and a series of data processing units of the second memory 124 as Illustrated in FIG. 3. The compression scheme selecting unit 424 may select a data processing combination which maximizes the compression ratio, and may select a compression scheme corresponding to the data processing combination selected from the plurality of compression schemes.

During a data exchange between the first memory 122 (for example, a DRAM) and the second memory 124 (for example, a NAND FLASH), the first memory 122 and the second memory 124 may exchange the data in various units such as the units of 64 B, 128 B, 1 KB, 2 KB, and 4 KB. Generally, the compression scheme is best when a large amount of data is compressed at a time. The method may have a good compression ratio, however, the method may be somewhat disadvantageous in terms of latency since it may take a long time for performing compression and decompression of the processed data. Therefore, the monitoring unit 422 may monitor the compression ratio according to various data processing units (i.e., granularity) from the minimum unit of the read/write operation (for example, 64 B) of a DRAM to the maximum unit of the read/write operation of a NAND flash, the compression scheme selecting unit 424 may select the granularity so that the compression ratio is maximized or so that the compression ratio related to the latency is maximized. The latency corresponding to the granularity of each compression technique may be previously decided in design, and therefore, the latency may be stored as a preset information in a corresponding control device.

Figure 7B:
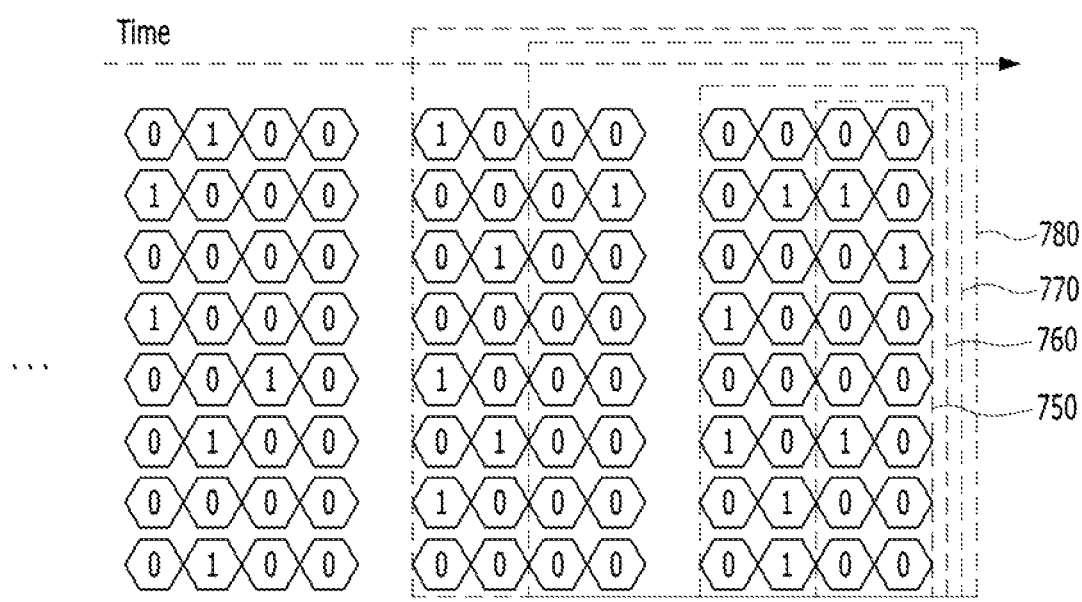
FIG. 7B is a diagram Illustrating another example of a data processing operation through a compression device of FIG. 3.

FIG. 7B is a diagram illustrating another example of a data processing operation through the compression device 310.

Referring to FIG. 7B, the value of the data to be compressed may be changed according to the granularity between the first memory 122 and the second memory 124. The value of the data to be compressed may be changed according to the granularity which is changed (denoted by reference numerals 750 to 780 in FIG. 7B) between the first memory 122 and the second memory 124. Accordingly, the compression ratio may be changed according to the compression techniques when the value of the data to be compressed is changed.

Referring back to FIG. 5, the data size controlling unit 426 may adjust a size of the data to be transferred to the second memory according to the selected compression scheme.

Figure 8:
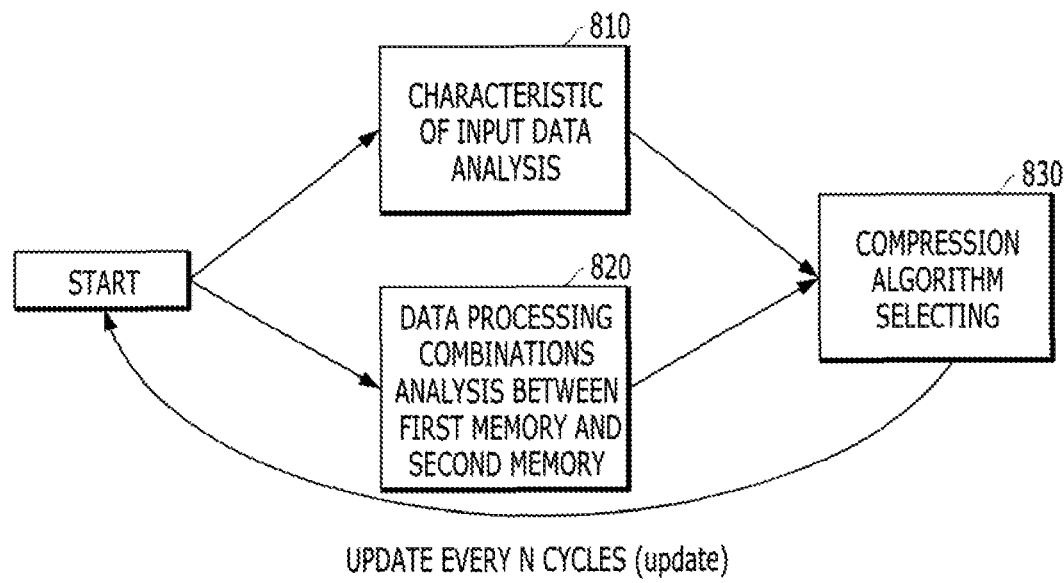
FIG. 8 is a flow chart of a data processing operation through a compression device, according to an embodiment of the invention.

FIG. 8 is a diagram illustrating a flow of a data processing operation through the compression device 310 according to an embodiment. For example, the flow illustrated in FIG. 8 may be performed through the control unit 420 of the compression device 310 illustrated in FIG. 4.

Referring to FIG. 8, in an embodiment, the control unit 420 may analyze a compression ratio corresponding to each of a plurality of compression schemes based on a characteristic of the input data at step 810, and may select a compression algorithm which maximizes the compression ratio among a plurality of compression algorithms at step 830.

In another embodiment, at step 820, the control unit 420 may analyze a compression ratio corresponding to each of a plurality of data processing combinations between a series of data processing units of the first memory 122 and a series of data processing units of the second memory 124 as illustrated in FIG. 3. The control unit 420 may select a data processing combination which maximizes the compression ratio, and may select a compression algorithm corresponding to the data processing combination selected among the plurality of compression algorithms at step 830.

The data processing operation according to the compression flow illustrated in FIG. 8 may be updated or reset every predetermined time, for example, every N cycles. In another example, the data processing operation may be reset whenever a data processing system including the memory system or computer is booted.

Figure 9:
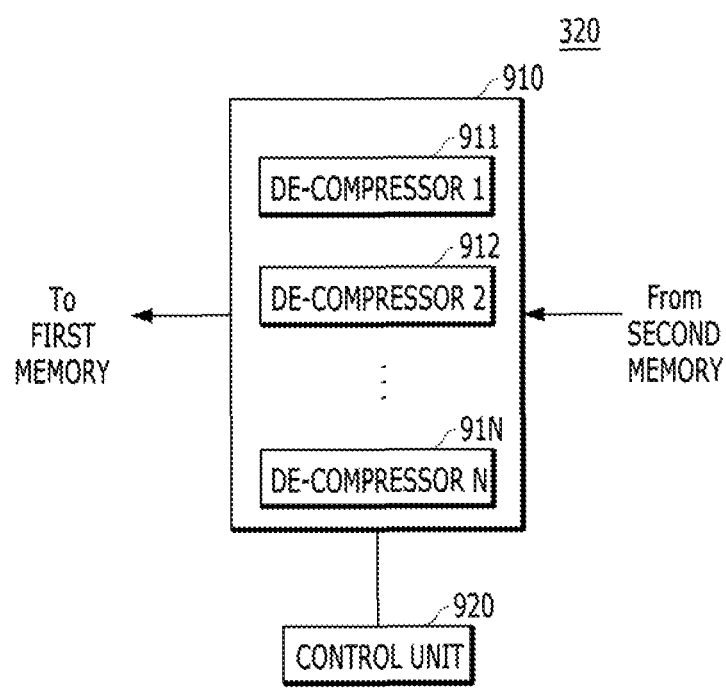
FIG. 9 is a diagram Illustrating a configuration of the decompression device of FIG. 3, according to an embodiment of the invention.

FIG. 9 is a configuration diagram illustrating the decompression device 320.

Referring to FIG. 9, the decompression device 320 may include a decompression unit 910 and a control unit 920. The decompression unit 910 may include a plurality (for example, N) of de-compressors 911 to 91N, each performing a decompression operation according to a different compression algorithm. For example, each of the de-compressors 911 to 91N may perform the decompression operation according to a compression algorithm, such as, for example, a frequent value compression (FVC), a frequent pattern compression (FPC), a base-delta immediate compression (BDI), a linearly compressed page (LCP), and the like. The decompression unit 910 may decompress the data supplied from the second memory 124, and may output the decompressed data to the first memory 122.

The control unit 920 may select at least one de-compressor among the de-compressors 911 to 91N included the decompression unit 910, may decompress the data supplied from the second memory 124 through the selected at least one de-compressor, and may control the decompressed data to be output to the first memory 122. The operation of selecting the at least one de-compressor through the control unit 920 may correspond to a reverse process of the operation of selecting the at least one compressor through the control unit 420 illustrated in FIG. 4. The control units 420 and 920 may be implemented with one or more processors.

In an embodiment, the control unit 920 may select the at least one de-compressor among the plurality of the de-compressors 911 to 91N based on a characteristic of the input data. For example, the characteristic of the input data may represent the ratio of values (0/1) included in the input data. Any other suitable characteristic of the Input data may also be used by the control unit 920 for selecting the at least one de-compressor among the plurality of the de-compressors 911 to 91N.

In another embodiment, the control unit 920 may select the at least one de-compressor among the plurality of the de-compressors 911 to 91N based on a selected data processing combination among a plurality of data processing combinations between a series of data processing units of the first memory 122 and a series of data processing units of the second memory 124. For example, the series of data processing units may include units of read and/or write operations of the first memory 122 and the second memory 124.

As described above, according to an embodiment of the present Invention, an access capacity Increase effect may be obtained by employing a compression scheme for data processed between the first memory and the second memory having different characteristics. As a result, substantial cost savings may also be achieved. At this time, the latency may minimize a compression overhead (i.e., latency) when a pipelining technique is used in consideration of the operating speed of the memory (for example, nonvolatile memory) having a relatively slow operation speed.

Although various embodiments have been described for illustrative purposes, it will be apparent to those skilled in the art that various changes and modifications may be made without departing from the spirit and/or scope of the invention as defined in the following claims.

What is claimed is:

1. A memory system comprising:
a first memory having a first operating speed;
a second memory having a second operating speed; and
a compression device configured to compress data of the first memory, and transfer the compressed data to the second memory,
wherein the compression device selects a compression scheme among a plurality of compression schemes based on at least one characteristic of the data of the first memory and a data processing combination selected among a plurality of data processing combinations between a series of data processing units of the first memory and a series of data processing units of the second memory, and compresses the data of the first memory according to the selected compression scheme,
wherein the characteristic of the data of the first memory represents a ratio of the number of 0's to the number of 1's contained in the data of the first memory,
wherein the series of data processing units of the first memory comprises units of read and/or write operations of the first memory, and the series of data processing units of the second memory comprises units of read and/or write operations of the second memory,
wherein the compressed data is stored in the second memory, and
wherein the first operating speed of the first memory is greater than the second operating speed of the second memory.

2. The memory system of claim 1, wherein the compression device comprises:
a monitoring unit configured to monitor a compression ratio corresponding to each of the plurality of compression schemes based on the at least one characteristic of the data of the first memory; and
a selecting unit configured to select one compression scheme which maximizes a compression ratio among the plurality of compression schemes.

3. The memory system of claim 1, wherein the compression device comprises:
a monitoring unit configured to monitor a compression ratio corresponding to each of the plurality of data processing combinations; and
a selecting unit configured to select a data processing combination which maximizes the compression ratio among the plurality of compression schemes, and select the compression scheme corresponding to the selected data processing combination.

4. The memory system of claim 1, wherein the compression device comprises a control unit configured to adjust a size of the data to be transferred to the second memory according to the selected compression scheme.

5. The memory system of claim 1, wherein the compression device resets the selected compression scheme at a predetermined time or at a point of time when the memory system is booted.

6. The memory system of claim 1, further comprising a decompression device configured to decompress the compressed data transferred to the second memory based on the selected compression scheme, and transfer the decompressed data to the first memory.

7. The memory system of claim 1, wherein the first memory comprises a volatile memory and the second memory comprises a nonvolatile memory.

8. The memory system of claim 7,
wherein the first memory comprises at least one of a buffer memory for the nonvolatile memory and a buffer and cache memory, and
wherein the second memory comprises a power backup storage for the volatile memory.

9. An operation method of memory system comprising:
compressing data from a first memory having a first operating speed; and
transferring the compressed data to a second memory having a second operating speed,
wherein the compressing of the data comprises selecting a compression scheme among a plurality of compression schemes based on at least one characteristic of the data of the first memory and a data processing combination selected among a plurality of data processing combinations between a series of data processing units of the first memory and a series of data processing units of the second memory, and compressing the data according to the selected compression scheme,
wherein the characteristic of the data of the first memory represents a ratio of the number of 0's to the number of 1's contained in the data,
wherein the series of data processing units of the first memory comprises units of read and/or write operations of the first memory, and the series of data processing units of the second memory comprises units of read and/or write operations of the second memory,
wherein the first operating speed of the first memory is greater than the second operating speed of the second memory, and
wherein the second memory stores the compressed data after being output from the first memory.

10. The operation method of claim 9, wherein the compressing of the data comprises:
monitoring a compression ratio corresponding to each of the plurality of compression schemes based on the characteristic of the data of the first memory; and
selecting a compression scheme which maximizes the compression ratio among the plurality of compression schemes.

11. The operation method of claim 9, wherein the compressing of the data comprises:
monitoring a compression ratio corresponding to each of the plurality of data processing combinations;
selecting a data processing combination which maximizes the compression ratio among the plurality of compression schemes; and
selecting the compression scheme corresponding to the selected data processing combination.

12. The operation method of claim 9, wherein the transferring comprises adjusting a size of the data to be transferred to the second memory according to the selected compression scheme.

13. The operation method of claim 9, wherein the compressing of the data comprises resetting the selected compression scheme at a predetermined time or at a point of time when the memory system is booted.

14. The operation method of claim 9, further comprising:
decompressing the compressed data transferred to the second memory based on the selected compression scheme; and
transferring the decompressed data to the first memory.

15. The operation method of claim 9, wherein the first memory comprises a volatile memory and the second memory comprises a nonvolatile memory.

16. The operation method of claim 15,
- wherein the first memory comprises at least one of a buffer memory for the nonvolatile memory and a buffer and cache memory,
- wherein the second memory comprises a power backup storage for the volatile memory.

* * * * *